May 2, 1967 R. N. JUNGLES ET AL 3,316,880
AUTOMATIC CAT LITTER BOX
Filed Oct. 24, 1965 2 Sheets-Sheet 1
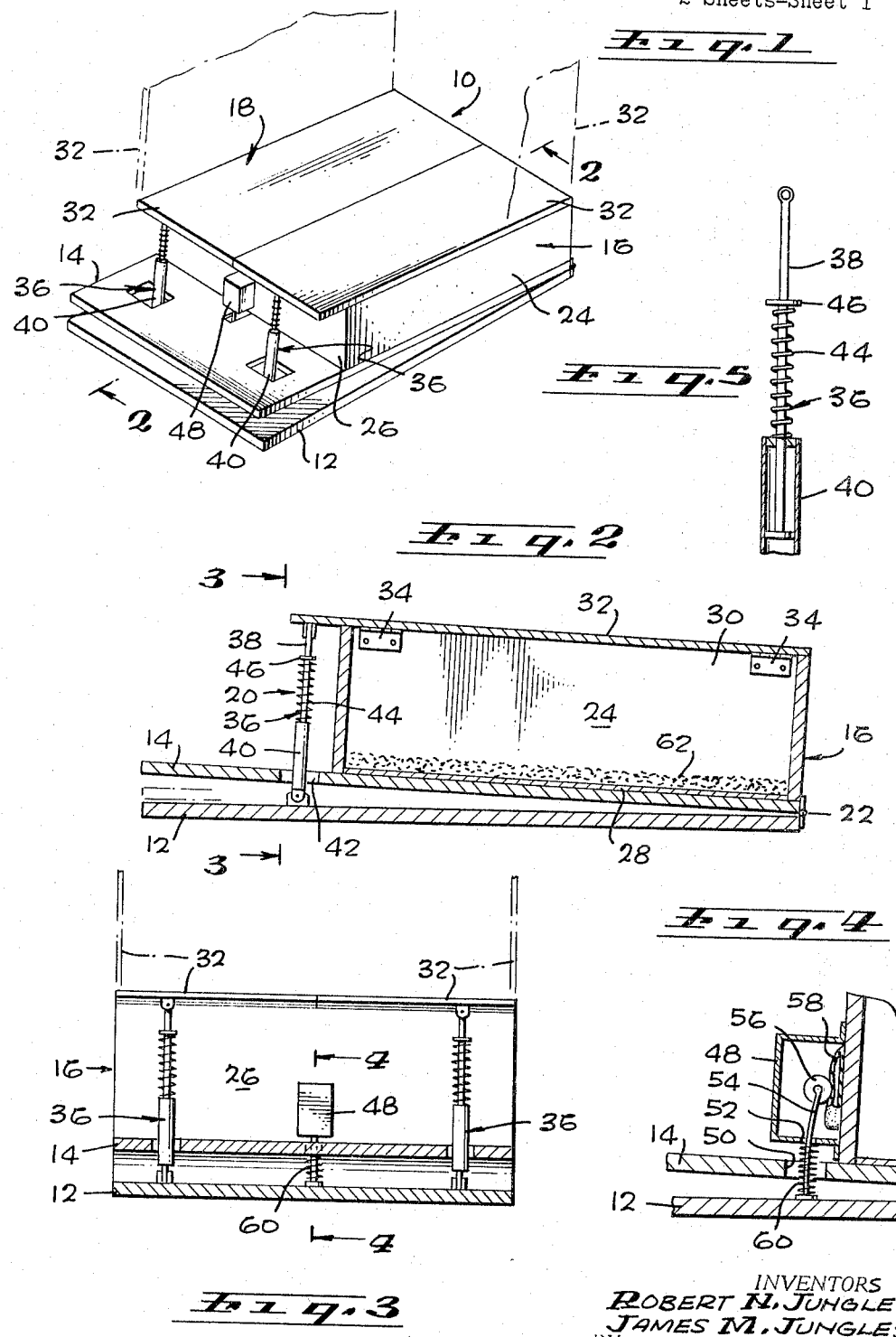
INVENTORS
ROBERT N. JUNGLES
JAMES M. JUNGLES
BY
Beehler & Arant
ATTORNEYS

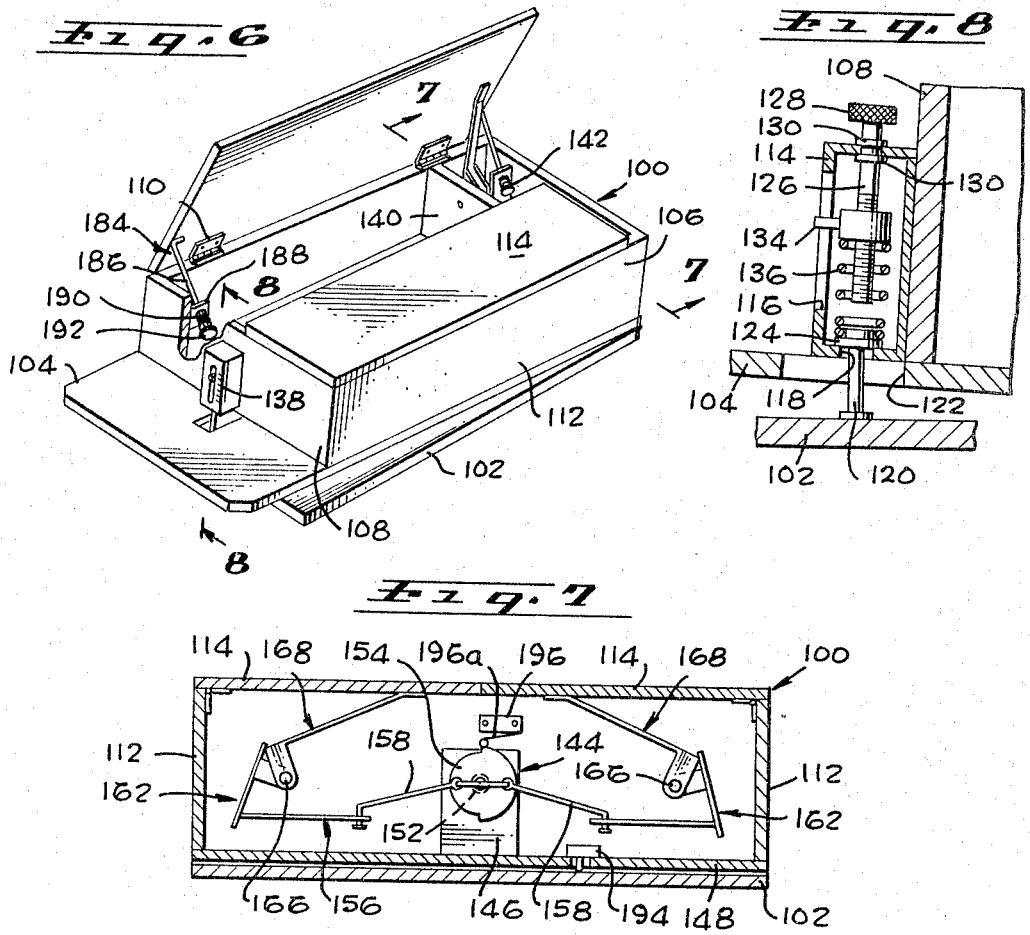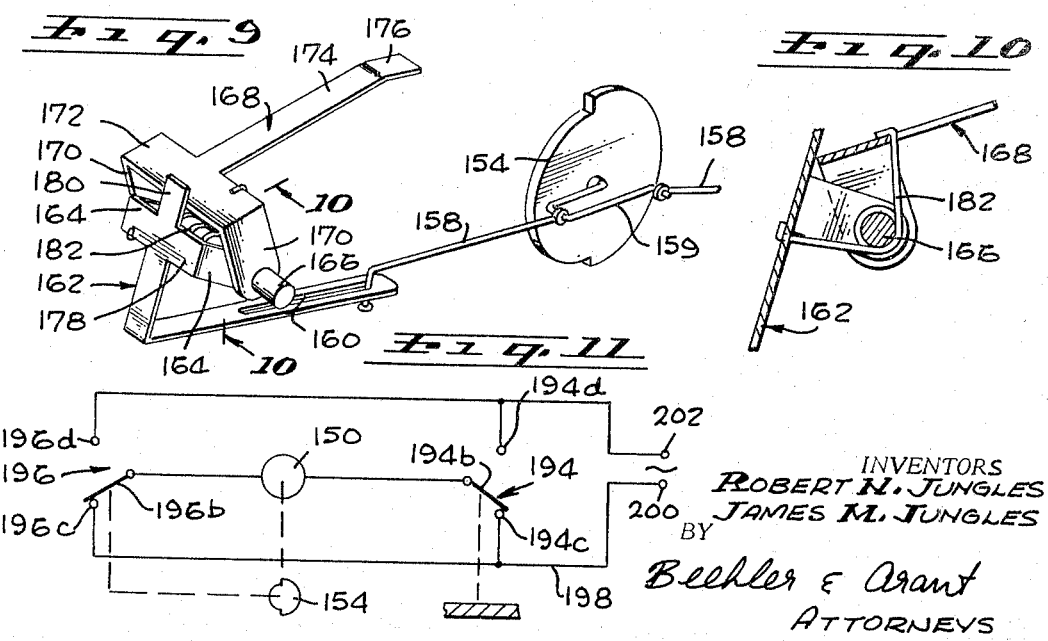

United States Patent Office 3,316,880
Patented May 2, 1967

3,316,880
AUTOMATIC CAT LITTER BOX
Robert N. Jungles and James M. Jungles, both of 1710 E. Francis, La Habra, Calif. 90631
Filed Oct. 24, 1965, Ser. No. 504,894
18 Claims. (Cl. 119—1)

This invention relates generally to aids for the care of pet animals and, more particularly, to an automatic sanitary enclosure and an automatic cat litter box embodying the enclosure, which are adapted to be operated by a pet animal.

In its broader aspects, the invention provides an automatic sanitary enclosure equipped with a base mounting, a resiliently supported treadle, and a receptacle having closure means movable between open and closed positions relative to a top opening of the receptacle. Operatively associated with the closure means are closure operating means which are effective to open the closure means in response to depression of the treadle toward the base and to return the closure means to closed position in response to return of the treadle to its normal position. In use, the sanitary enclosure is located in a position convenient to the pet animal to be serviced and the animal is trained to open the receptacle closure means by stepping on the treadle. When the weight of the animal is removed from the treadle, the treadle spring returns the treadle to its normal position, thereby returning the closure means to closed position.

As will appear from the ensuing description, the automatic sanitary enclosure of the invention may be employed for various pet care purposes. For example, a sanitary enclosure according to the invention may contain pet food, water, or the like for the purpose of shielding the same against flies, dirt, and other forms of contamination while affording an animal with access to the food and water. However, the principal application of the invention, and particularly the disclosed embodiments thereof, is a sanitary litter box for cats.

In these disclosed embodiments of the invention, the treadle is fixed to the receptacle and the receptacle, in turn, is resiliently mounted for movement toward and away from the base in such a way that the receptacle is depressed toward the base, to open the receptacle closure means, under the weight of a cat standing either on the treadle or the receptacle. A significant and important feature of these disclosed embodiments resides in the fact that the closure means comprise hinged covers which are operated between their open and closed positions by resiliently yieldable, lost motion means that permit independent opening and closing of the covers. Accordingly, the weight of a cat standing on the treadle will effect simultaneous opening of both covers. The weight of a cat standing on one cover of the receptacle, on the other hand, will effect opening of the other cover only. When the cat steps into the receptacle, the closed cover also opens. The covers remain open so long as the cat remains in the litter box and reclose automatically when the cat leaves the box.

In use of the litter box, the bottom wall of the receptacle is covered with a layer of sand or the like. The cat to be serviced by the litter box is trained to open the hinged covers of the box, preferably by standing on the treadle. However, in the event that the cat should stand on one cover of the box, the other cover is opened, as just noted, thereby to provide the cat with access to the receptacle. When the cat steps into the receptacle from the cover on which it is standing, the latter cover also opens. Both covers close automatically when the cat steps from the receptacle.

Two specific embodiments of the present litter box are disclosed. One embodiment employs a purely mechanical cover operating mechanism. The other litter box employs an electro-mechanical operating mechanism. While these disclosed embodiments of the invention are intended primarily to serve as sanitary litter boxes, they may, conceivably, be employed for other pet care purposes.

It is a general object of the invention, therefore, to provide a novel automatic sanitary enclosure which is adapted to be operated by a pet animal.

Another object of the invention is to provide an automatic sanitary enclosure which is particularly suited for use as a sanitary litter box for cats.

Yet another object of the invention is to provide an automatic sanitary enclosure wherein the receptacle closure means, or covers, are arranged to be opened by the weight of an animal standing on the treadle or the receptacle of the enclosure, and wherein further the covers are resiliently operated between their open and closed positions in such a way that the weight of the animal on either cover is effective to independently open the opposite cover without inflicting damage to the cover operating mechanism.

A further object of the invention is to provide an automatic sanitary enclosure wherein the force required to open the receptacle closure means, or covers, may be adjusted in accordance with the weight of the animal to be serviced.

Yet a further object of the invention is to provide an automatic sanitary enclosure which may utilize either a purely mechanical cover operating mechanism or an electro-mechanical cover operating mechanism.

A still further object of the invention is to provide an automatic sanitary enclosure of the character described which is relatively simple in construction, economical to manufacture, reliable in operation, pleasing in appearance, compact in size, safe, and otherwise ideally suited to its intended purposes.

Other objects, advantages, and features of the invention will become readily evident as its description proceeds.

With these and such other objects in view, the invention consists in the construction, arrangement, and combination of the various parts of the enclosure, whereby the objects contemplated are attained, as hereinafter set forth, pointed out in the appended claims, and illustrated in the accompanying drawings.

In these drawings:

FIGURE 1 is a perspective view of an automatic sanitary enclosure, or cat litter box, according to the invention;

FIGURE 2 is an enlarged section taken on line 2—2 in FIGURE 1;

FIGURE 3 is a section taken on line 3—3 in FIGURE 2;

FIGURE 4 is an enlarged section taken on line 4—4 in FIGURE 3;

FIGURE 5 is a fragmentary detail of one element of the closure or cover operating mechanism embodied in the sanitary enclosure;

FIGURE 6 is a perspective view of a modified automatic sanitary enclosure, or cat litter box, according to the invention, illustrating one cover of the enclosure in its closed position and the other cover in a partially opened position;

FIGURE 7 is an enlarged section taken on line 7—7 in FIGURE 6;

FIGURE 8 is an enlarged section taken on line 8—8 in FIGURE 6;

FIGURE 9 is an enlarged fragmentary perspective view of a portion of the cover operating mechanism embodied in the enclosure;

FIGURE 10 is a section taken on line 10—10 in FIGURE 9; and

FIGURE 11 is a schematic circuit diagram of the cover operating mechanism embodied in the sanitary enclosure of FIGURE 6.

As noted earlier, the automatic sanitary enclosures illustrated in these drawings are intended primarily for use as sanitary litter boxes for cats and will be described in this connection. The litter box 10 illustrated in FIGURES 1 through 5 comprises a base 12 mounting a treadle 14 and a receptacle 16 having closure means 18. The treadle 14 is resiliently supported on the base 12 for movement between upper and lower limiting positions relative to the base. As will appear presently, the treadle normally occupies in its upper limiting position relative to the base and the closure means 18 are normally closed. Operatively associated with the closure means 18 are closure operating means 20 which are effective to automatically open the closure means, and thereby expose the interior of the receptacle 16, in response to downward depression of the treadle 14 toward the base 12 under the weight of a cat standing on the treadle and to automatically reclose the closure means in response to upward spring return of the treadle to its normal position when the cat steps from the treadle.

Referring now in greater detail to the automatic sanitary litter box 10, it will be observed that the base 12 comprises a flat rectangular plate. The treadle 14 comprises a second rectangular plate which overlies the base plate. Two adjacent ends of these plates are pivotally connected by a hinge 22 which permits swinging movement of the distal end of the treadle plate toward and away from the base plate. The receptacle 16 is mounted on the hinged end of the treadle plate 14. Accordingly, the receptacle and treadle plate are moveable in unison relative to the base plate. Receptacle 16 comprises upstanding side and end walls 24 and 26, respectively, and a bottom wall 28.

Closure means 18 normally overlie and close the top opening 30 of the receptacle 16. These closure means comprise a pair of rectangular covers 32 which are pivotally attached, by hinges 34, to the upper edges of the receptacle side walls 24, respectively, for pivotal movement between open and closed positions relative to receptacle opening 30. In closed positions, these covers rest on the upper edges of the upstanding receptacle walls 24, 26 and have their confronting longitudinal edges disposed in close proximity, as shown. In their open positions, the covers stand generally upright, as illustrated in phantom outline in FIGURE 1, and expose the interior of the receptacle. It is significant to note at this point that the length of the covers 32 is somewhat greater than the length of the receptacle 16 and that the ends of the covers, remote from the treadle plate hinge 22, extend a distance beyond the adjacent end of the receptacle.

The closure or cover operating means 20 co-act between the base plate 12 and the extending ends of the covers 32. These operating means comprise a pair of links 36. Each link includes upper and lower telescoping sections 38 and 40. The upper ends of the upper link sections 38 are pivotally attached to the extending ends of the cover 32, close to the hinging axes of the respective covers. The lower ends of the lower link sections 40 extend through openings 42 in the treadle plate 14 and are pivotally attached to the base plate 12. The axes of the pivotal connections between the upper link sections 38 and the receptacle covers 32 parallel the hinging axes of the covers. The pivot axes of the lower link sections 40 parallel the hinging axis of the treadle plate 14. The pivotal connections of the link sections, however, have a certain amount of play, for reasons to be explained presently.

Centrally fixed to the receptacle end wall 26 adjacent the links 36 is a small housing 48 which overlies an opening 50 in the treadle plate 14. Extending centrally through the treadle plate opening 50 and an opening 52 in the lower wall of the housing 48, is a spring arm 54, the lower end of which is fixed to the base plate 12. The upper end of the arm 54 is bifurcated to straddle and rotatably mount a roller 56. Roller 56 bears against a hollow flexible tube 58 fixed to the adjacent end wall 26 of the receptacle 16. This tube is sealed and contains a viscous liquid. Surrounding the rod 54, between the base plate 12 and the lower wall of the housing 48, is a compression spring 60 which seats at its ends against the base plate and the housing wall, respectively. This spring urges the treadle plate 14, and the receptacle 16 supported thereon, to their upper limiting or normal position illustrated in the drawings.

It is now evident that when the treadle plate 14 is depressed downwardly toward the base plate 12, the links 36 exert an upward thrust on their respective covers 32, thereby rotating these covers from their full line closed positions to their phantom line open positions of FIGURES 1 and 3. It is evident, of course, that during downward depression of the treadle plate 14 and resultant pivotal opening movement of the covers 32, the links 36 are required to pivot relative to the base plate and covers both about their respective pivot axes and axes normal to these pivot axes. The play, referred to earlier, in the pivotal connections of the links is sufficient to accommodate the required pivotal movement about said normal axes. When the treadle plate 14 is depressed downwardly towards the base plate 12, the spring 60 is compressed. Accordingly, when the treadle plate is released, this plate and the receptacle 16, are returned upwardly to their normal position by the action of the spring 60. During this upward return movement of the treadle plate and receptacle, the links 36 exert a downward thrust on the covers 32 thereby returning these covers to their closed positions.

The roller 56 on the spring arm 54 and the flexible, liquid filled tube 58 against which the roller bears, together constitute a damping means which retards pivotal movement of the treadle plate 14 between its upper and lower limiting positions relative to the base plate 12 as well as pivotal movement of the covers 32 between their open and closed positions. Thus, the spring tension in the roller supporting rod 54 is sufficient to cause the roller 56 to compress the tube 58 in the region of contact of the roller with the tube. Accordingly, when the roller moves back and forth along the tube 58, as it does during pivotal movement of the treadle plate 14 relative to the base plate 12, the viscous liquid in the tube is forced from one end of the tube to the other end of the tube through the restricted clearance space or effective orifice which is formed within the tube, opposite the roller, as a result of the spring pressure of the roller against the tube. This flow of the viscous liquid through the restricted interior tube space produces a retarding or damping action on the treadle plate and the covers.

In use of the litter box 10, the latter is placed on the floor or other supporting surface readily accessible to the cat to be serviced by the box. The bottom wall 28 of the receptacle 16 is covered with a layer 62 of sand, or the like. The cat is then trained to open the covers 32 of the receptacle 16, and thereby provide the cat with access to the sand in the receptacle, by stepping on the exposed, extending end of the treadle plate 14, remote from the treadle plate hinge 22. In this regard, attention is directed to the fact that the spring 60 is selected to have a rate such that this spring normally retains the treadle plate and receptacle in a normal, upper limiting position and yields under the weight of the cat. After the covers 32 have opened, the cat may step into the receptacle 16. The weight of the cat, of course, retains the covers open while the cat is in the receptacle. When the cat steps from the receptacle, the spring 60 returns the treadle plate 14 and the receptacle 16 upwardly to their normal position, thereby reclosing the covers 32.

Although a cat may be trained to thus open the receptacle covers 32 by stepping on the treadle 14, the cat may, in some cases, stand on one of the covers 32. In this case, the weight of the cat depresses the receptacle and the treadle plate 14 toward the base plate 12, as before. Now, however, the cover on which the cat is standing remains closed and only the opposite cover opens. This independent opening of the covers is permitted by the telescoping construction of the cover operating links 36. Thus, the link 36 which is attached to the cover on which the cat is standing merely telescopes, against the action of the link spring 44, when the treadle plate 14 and receptacle 16 are depressed toward the base plate 12 by the weight of the cat. This prevents damage to the cover operating means and permits one cover to open, thereby to enable the cat to step into the receptacle 16. When the weight of the cat is removed from the currently closed cover 32, the latter is opened by the action of its respective link spring 44.

The spring loaded damping roller 56 and tube 58 retard vertical movement of the treadle plate 14 relative to the base plate 12 as well as opening and closing movement of the covers 32, thereby to prevent excessively rapid movement of these parts when a cat steps onto and off the litter box, thereby to eliminate the possibility of injury to the cat.

The covers 32 in the litter box 10, just described, are obviously mechanically actuated. The covers of the modified litter box 100 illustrated in FIGURES 6 to 11 are electro-mechanically actuated. The litter box 100, like litter box 10, comprises a base plate 102, at treadle plate 104 hinged at one end to one end of the base plate, and a receptacle 106 mounted on the hinged end of the treadle plate. The end of the treadle plate remote from the hinged end thereof extends beyond the adjacent end wall 108 of the receptacle. Pivotally connected, by hinges 110, to the upper edges of the receptacle side walls 112, are covers 114. In their closed positions, these covers rest on the upper edges of the receptacle walls and have their confronting longitudinal edges disposed in close proximity so as to effectively close the top opening of the receptacle 106. In their open positions, the covers 114 stand generally upright, as before. Centrally fixed to the receptacle end wall 108 adjacent the extending end of the treadle plate 104 is a small housing 114 having a slot 116 in its front wall and an opening 118 in its lower wall. Fixed to the base plate 102, in line with the lower housing opening 118, is a pin 120 which extends upwardly through an opening 122 in the treadle plate 104 and the lower opening 118 in the housing 114. Fixed to the upper end of the pin 120, within the housing 114, is a shouldered cap 124. The diameter of this cap is slightly larger than the diameter of the lower housing opening 118. Extending rotatably through the upper wall of the housing 114 is a threaded shaft 126 terminating, at its upper end, in a knurled knob 128 located externally of the housing. Shaft 126 is restrained against axial movement relative to the housing by thrust shoulders 130 on the shaft. Threaded on the shaft 126, within the housing 114, is a nut 132 having a radially projecting pointer 134 which extends through the housing slot 116. A compression spring 136 encircling the lower end of the shaft 126 seats at its lower end against the cap 124 on the pin 120 and at its upper end against the nut 132. It is evident, therefore, that the spring 136 is effective to urge the treadle plate 104 and the receptacle 106 upwardly away from the base plate 102 to the upper limiting or normal position of FIGURES 6 and 8, wherein the lower wall of the housing 114 engages the cap 124. The upward thrust exerted by the spring 136 on the treadle plate 104, and hence the downward force on the treadle plate required to depress the latter toward the base plate 102 may be adjusted by rotation of the threaded shaft 126. If desired, the front wall of the housing 114 may be inscribed with a scale 138 for co-operation with the pointer 134 to indicate this force.

Extending across the interior of the receptacle 106 adjacent one end thereof is a partition 140. Partition 140 and the adjacent receptacle end wall 108 define therebetween a compartment 142 for containing an electromechanical cover operating means 144.

This operating means comprises a housing 146 which is fixed to the bottom wall 148 of the receptacle 106 and contains an electrical motor 150. Motor 150 drives a rotary output shaft 152 rotatably supported on the motor housing 146, through reduction gearing (not shown) within the housing. One end of the output shaft 152 extends externally of the motor housing 146 and mounts a cam 154. Cam 154 is operatively connected, through a pair of link means 156, to the receptacle covers 114, respectively, in such manner that rotation of the cam through 180° from its position of FIGURE 7 is effective to rotate the covers from their closed positions to their open positions. Rotation of the cam 154 back to its position of FIGURE 7 is effective to rotate the covers from their open positions to their closed positions.

Each of the link means 156 comprises a link 158, one end of which is rotatably attached to a crank 159 fixed to the cam 154. The opposite end of the link 158 is turned at right angles and engaged in a slot 160 in one arm of a bell crank like part 162. Bell crank 162 has a pair of spaced parallel arms 164 which are rotatably fitted on a shaft 166 located above and extending generally normal to the bell crank arm 160. Each of the link means 156 further comprises a lever 168 having a pair of spaced parallel arms 170 which are rotatably fitted on the shaft 166 outboard of the bell crank arms 164. The lever arms 170 are bridged by a cross piece 172. Extending from the center of the cross piece 172, back over the bell crank arm 160 and toward the cam 154, is an arm 174 terminating, at its outer end, in an angularly disposed tip 176. The bell crank arms 164 are bridged by a cross piece 178, from the center of which extends a projection 180. This projection engages the edge of the lever cross piece 172 remote from the lever arm 174. Encircling the shaft 166 between the bell crank arms 164 is a torsion spring 182. The ends of this torsion spring are connected to the cross piece 172 of the lever 168 and the cross piece 178 of the bell crank 162, respectively. Spring 182 is tensioned to normally urge the bell crank 162 and the lever 168 to their positions of FIGURE 9, wherein the bell crank projection 180 bears against the lever cross piece 172.

The shafts 166 of the two link means 156 are located adjacent the receptacle side walls 112, respectively, and are supported at their ends in the partition 140 and the adjacent end wall 108 of the receptacle. The lever arm tips 176 bear against the undersurfaces of their respective adjacent covers 114, as shown.

Referring to FIGURE 7, it is evident that during rotation of the cam 154 through 180° from its illustrated position the links 158 are rotated and moved longitudinally in such a way that these links pull on the bell crank arms 160 in directions to rotate the left hand bell crank in FIGURE 7 in a counterclockwise direction on is supporting shaft 166 and the right hand bell crank in a clockwise direction on its supporting shaft. This rotation of the bell cranks is abviously effective to drive the respective levers 168 in rotation about their supporting shafts 166 through the corresponding torsion springs 182 in directions to rotate the receptacle covers 14 from their closed positions to their open positions. During return rotation of the cam 154 through 180° back to its position of FIGURE 7, the links 158 are rotated and move longitudinally in the opposite direction to release the bell cranks 172, and thereby the levers 168, for return rotation about their respective supporting shafts 166 to the position of FIGURE 7, wherein the lever arms 174 are disposed to permit closing of the covers 114. Actual rotation of the covers to their closed positions is effected by elastic limit stops 184 which are operatively connected between the covers and the receptacle end walls 108, respectively. Each limit stop 184 comprises a rod 186 which is pivotally attached at one end to the respective cover 114. The other end of each rod 186 extends through a pivotally mounted bracket 188 on the adjacent receptacle end wall 108. Encircling the free end of each limit stop rod 186, beyond the adjacent rod bracket 188, is a coil spring 190. Each spring seats at one end against the adjacent bracket 188 and at the opposite end against a shoulder 192 on the respective rod 186. These springs 190 are axially dimensioned so that they are compressed between the brackets 188 and the rod shoulders 192 during movement of the covers 114 to their open positions during operation of the cover operating means 144, in the manner just explained. During operation of the cover operating means 144 through the half cycle thereof which releases the covers 114 for closing movement, the springs 190 expand, thereby causing the covers to follow the cover operating levers 168 to their closed position of FIGURE 7.

The cover operating motor 150 is controlled by two switches 194 and 196. Switch 194 is a load sensing switch which is mounted on the bottom wall 148 of the receptacle 106 and includes an actuating element 194a extending through an opening in the wall for engagement with the base plate 102 upon downward depression of the treadle plate 104 toward the base plate. Switch 196 is a limit switch which is mounted on the motor housing 146 and includes an actuating element 196a engaging the peripheral cam surface of the cam 154.

Motor 150 and switches 194, 196 are electrically connected in the manner illustrated in FIGURE 11. When the treadle plate 104 and the receptacle 106 occupy their upper normal position relative to the base plate 102, the movable contact 194b of the switch 194 is closed to a stationary switch contact 194c, and the movable contact 196b of the switch 196 is closed to a stationary switch contact 196c. Both of these switch contacts are connected, through a lead 198, to an input terminal 200 of the motor energizing circuit. Accordingly, the cover operating motor 150 remains de-energized. When the treadle plate 104 is depressed toward the base plate 102, the actuating element 194a of the switch 194 is displaced upwardly, thereby closing the movable switch contact 194b to the stationary switch contact 194d. This latter contact, as well as the stationary contact 196d of the switch 196 are connected to the other input terminal 202 of the motor energizing circuit. Accordingly, the cover operating motor 150 is energized to drive the cam 154 in rotation and, thereby, rotate the covers 114 to their open positions. When the came 154 has been rotated through 180°, the actuating element 196a of the motor switch 196 rides onto the low portion of the cam surface, thereby closing the movable switch contact 196b to the stationary switch contact 196d to de-energize the motor. Release of the treadle plate 104 for return to its upper normal position relative to the base plate 102 releases the actuating element 194a of the switch 194, and, thereby, effects reclosing of the movable switch contact 194b to the stationary switch contact 194c. This results in re-energizing of the cover operating motor 150 and rotation of the cam 154 back to its position of FIGURE 7. During this rotation of the cam, the covers 114 are reclosed by the cover limit stop springs 190, as described earlier. Upon return of the cam 154 to its position of FIGURE 7, the actuating element 196a of the switch 196 rides onto the high portion of the cam surface, thereby reclosing the movable switch contact 196b to the stationary switch contact 196c and de-energizing the motor 150 to complete one operating cycle of the cover operating means 144. This operating cycle is repeated each time the treadle plate 104 is depressed toward the base plate 102 and thereafter released.

In use of the modified liter box 100, the treadle biasing spring 136 is adjusted by rotation of the shaft 126, to a setting such that the treadle plate 104 will be depressed toward the base plate 102, sufficiently to effect opening of the receptacle covers 114, by the weight of a cat standing on the exposed, extending end of the treadle plate. As before, the cat is trained to effect opening of the covers by standing on this exposed end of the treadle plate. The covers remain open until the cat steps from the treadle plate or the receptacle 106.

As noted earlier, even though a cat is trained to open the receptacle covers 114 by stepping on the treadle plate 104, the cat may, in some cases, stand on one of the covers. In this case, the treadle plate is depressed toward the base plate 102 to energize the cover operating motor 150, as before. Now, however, the cover on which the cat stands remains closed and only the opposite cover is opened by the cover operating means 144. This is permitted by the fact that the opening forces generated by the cover operating motor 150 are transmitted to the covers 114 through the torsion springs 182. If the cat stands on one of the covers, as just noted, that cover remains closed and the corresponding torsion spring 182 simply yields. Since the other cover is opened, however, the cat may step into the receptacle 106. When the weight of the cat is removed from the currently closed cover, the associated torsion spring rotates the cover to its open position.

Engagement of the bent ends of the cover operating links 158 in the slots of their respective bell crank arms 160 provides a lost motion in the cover operating means 144 which protects the latter against damage in the event that the bell cranks 162 or levers 174 encounter an obstruction during return to their closed positions of FIGURE 7. Thus, if such an obstruction is encountered, the bent end of the corresponding cover operating link 158 merely moves lengthwise of its respective bell crank slot, thus permitting rotation of the cam 154 to its position of FIGURE 7 while the obstructed bell crank and lever remain stationary.

It is now evident that the invention herein described and illustrated is fully capable of retaining several objects and advantages preliminarily set forth.

While the invention has herein shown and described in what is presently conceived to be certain of its most practical and preferred embodiments, it is recognized that departures may be made therefrom within the scope of the invention, which is not to be limited to the details disclosed herein but is to be accorded the full scope of the claims so as to embrace and any all equivalent devices.

Having described the invention, what is claimed as new in support of Letters Patent is:

1. An automatic sanitary enclosure adapted to be operated by an animal, comprising:
   supporting base means;
   a receptacle including a treadle mounted on said base means for movement between upper and lower limiting positions relative to said base means;
   spring means co-acting between said treadle and base means for urging said treadle to said upper limiting position thereof and yielding under the weight of an animal standing on said treadle;
   said receptacle movably supported by said base means and having a top opening;
   closure means mounted on said receptacle for movement between open and closed positions relative to said opening; and
   closure operating means responsive to movement of said treadle and operatively engaging said closure means for effecting opening of said closure means in response to movement of said treadle from said upper limiting position toward said lower limiting position relative to said base means and closing of said closure means in response to return of said treadle to said upper limiting position.

2. An automatic sanitary enclosure to be operated by an animal, comprising:
   supporting base means;
   a receptacle having a top opening;
   closure means mounted on said receptacle for movement between open and closed positions relative to said opening;

means movably mounting said receptacle on said base means for movement between upper and lower limiting positions relative to said base means;
spring means co-acting between said base means and receptacle for urging said receptacle to said upper limiting position; and
closure operating means responsive to movement of said receptacle relative to said base means for effecting opening of said closure means in response to movement of said receptacle from said upper limiting position toward said lower limiting position relative to said base means and closing of said closure means in response to return of said receptacle to said upper limiting position.

3. An automatic sanitary enclosure according to claim 2 wherein:
said closure means comprises a hinged cover; and
said operating means comprises a link operatively connected between said base means and said cover.

4. An automatic sanitary enclosure according to claim 2, wherein:
said closure means comprises a hinged cover; and
said operating means comprises a link operatively connected between said base means and cover and including telescoping sections, and a spring operatively connected between said link sections for yieldably resisting telescoping movement thereof.

5. An automatic sanitary enclosure according to claim 1 wherein:
said operating means comprises electrically actuated power means operatively connected between said receptacle and said closure means for effecting movement of said closure means between said open and closed positions in response to energizing and de-energizing of said power means, and switch means for controlling said power means in response to movement of said treadle relative to said base means.

6. An automatic sanitary enclosure according to claim 2 wherein:
said operating means comprises electrically actuated power means, resiliently yieldable link means operatively connecting said power means and closure means for effecting movement of said closure means between said open and closed positions in response to energizing and de-energizing of said power means, and switch means for controlling said power means in response to movement of said recepetacle relative to said base means.

7. An automatic sanitary enclosure according to claim 2 wherein:
said operating means comprises an electrical motor, a rotary output shaft driveably coupled to said motor, means operatively connecting said shaft and closure means, whereby rotation of said shaft from a first given angular position to a second given angular position thereof is effective to drive said closure means from said closed position to said open position and rotation of said shaft from said second angular position to said first angular position is effective to drive said closure means from said open position to said closed position, and switch means for controlling said motor in response to movement of said receptacle relative to said base means in such manner that said motor is energized to drive said shaft from said first angular position to said second angular position in response to movement of said receptacle from said upper limiting position towards said lower limiting position and said motor is energized to drive said shaft from said second angular position to said first angular position in response to return of said receptacle to said upper limiting position.

8. An automatic sanitary enclosure adapted to be operated by an animal, comprising:
supporting base means;
a receptacle having a top opening;
a pair of hinged covers pivotally mounted on said receptacle for movement between open and closed positions relative to said opening;
means movably mounting said receptacle on said base means for movement between upper and lower limiting positions relative to said base means;
spring means co-acting between said base means and receptacle for urging said receptacle to said upper limiting position; and
cover operating means responsive to movement of said receptacle relative to said base means for effecting opening of said covers in response to movement of said receptacle from said upper limiting position toward said lower limiting position relative to said base means and closing of said covers in response to return of said receptacle to said upper limiting position, said operating means including separate resiliently yieldable link means for transmitting opening forces to said covers, respectively, in response to movement of said receptacle from said upper limiting position toward said lower limiting position relative to said base means, whereby either of said covers may be opened by the weight of an animal on the other cover.

9. An automatic sanitary enclosure according to claim 8 wherein:
each of said link means includes a lost motion connection to permit independent closing of said covers.

10. An automatic sanitary enclosure according to claim 1 including:
damping means for retarding movement of said closure means between said open and closed positions.

11. An automatic sanitary enclosure according to claim 1 including:
means for adjusting the force exerted by said spring means on said treadle.

12. An automatic sanitary enclosure according to claim 2 including:
a treadle extending beyond one side of and fixed to said receptacle on which an animal may stand to depress said receptacle toward said base means.

13. An automatic cat litter box, comprising:
a base plate;
a receptacle overlying and hinged along one side to said base plate for movement of the other side of said receptacle between upper and lower limiting positions relative to said base plate;
a spring acting between said base plate and receptacle for urging said receptacle to said upper limiting position;
said receptacle having a top opening;
a pair of hinged covers pivotally mounted on said receptacle along the remaining sides, respectively, thereof for movement between open and closed positions relative to said opening; and
a pair of resilient links pivotally connected at one end to said base plate and at their other ends to said covers, respectively, close to the hinging axes of the respective covers for effecting opening of said covers in response to movement of said receptacle from said upper limiting position towards said lower limiting position and closing of said covers in response to return of said receptacle to said upper limiting position.

14. An automatic litter box according to claim 13 including:
a treadle fixed to and extending beyond said other side of said receptacle on which an animal may stand to depress said receptacle toward said base plate.

15. An automatic litter box according to claim 13 wherein:
each of said links comprises a pair of telescoping sections, and a spring operatively connected to said sections for yieldably resisting telescoping movement thereof.

16. An automatic cat litter box, comprising:

a base plate;

a receptacle overlying and hinged along one side to said base plate for movement of the other side of said receptacle between upper and lower limiting positions relative to said base plate;

said receptacle having a treadle extending beyond said one side hereof;

a spring co-acting between said base plate and receptacle to said upper limiting position;

said receptacle having a top opening;

a pair of hinged covers pivotally mounted on said receptacle along the remaining sides, respectively, thereof for movement between open and closed positions relative to said opening;

a motor mounted within said receptacle;

a roary output shaft driveably coupled to said motor;

resilient link means operatively coupling said shaft and covers, respectively constituting a means for rotation of said shaft from a first given angular position to a second given angular position which is effective to drive said covers from their closed positions to their open positions and rotation of said shaft from said second position to said first position is effective to drive said covers from their open positions to their closed positions; and switch means responsive to movement of said receptacle relative to said base plate and to the position of said shaft for controlling said motor in such manner that said motor is energized to drive said shaft from said first position to said second position in response to movement of said receptacle from said upper limiting position toward said lower limiting position relative to said base plate and said motor is energized to drive said shaft from said second position to said first position in response to return of said receptacle to said upper limiting position.

17. An automatic cat litter box according to claim 16 wherein:

said link means include resiliently yieldable means for permitting independent opening of said covers and lost motion means for permitting independent closing of said covers.

18. An automatic cat litter box according to claim 16 wherein:

said switch means include a first switch co-acting between said receptacle and base plate, a second switch, and a cam on said shaft for actuating said second switch in response to rotation of said shaft to said first and second positions.

References Cited by the Examiner

UNITED STATES PATENTS

| 2,204,416 | 6/1940 | Kramer | 119—15 |
| 2,218,423 | 10/1940 | Harnar | 119—1 |
| 2,975,759 | 3/1961 | Stromblad | 119—50 |
| 3,111,932 | 11/1963 | Knutson | 119—1 |
| 3,227,138 | 1/1966 | Cambell | 119—1 |

SAMUEL KOREN, *Primary Examiner.*

ALDRICH F. MEDBERY, *Examiner.*